United States Patent [19]
Smit et al.

[11] Patent Number: 5,349,909
[45] Date of Patent: Sep. 27, 1994

[54] SHELVING UNIT

[75] Inventors: Kenneth J. Smit, Hudsonville; James A. Brown, Grand Haven, both of Mich.

[73] Assignee: The Worden Company, Holland, Mich.

[21] Appl. No.: 906,860

[22] Filed: Jun. 26, 1992

[51] Int. Cl.⁵ ............................................. A47B 9/00
[52] U.S. Cl. ................................ 108/107; 108/193; 211/187; 248/250
[58] Field of Search .............. 108/107, 111, 153, 154, 108/180, 186, 187, 192, 193; 211/187, 186, 190, 189, 208, 207; 248/220.2, 250

[56] References Cited

U.S. PATENT DOCUMENTS

| | | | |
|---|---|---|---|
| 869,491 | 10/1907 | Hurteau | 108/107 |
| 1,209,157 | 12/1916 | Heerdt | 108/111 |
| 3,596,942 | 8/1971 | Zoebelein | 108/111 X |
| 4,029,025 | 6/1977 | Lundqvist | 108/107 X |
| 4,345,525 | 8/1982 | de Poorter | 108/107 |
| 4,589,350 | 5/1986 | Tapojärvi | 108/111 |
| 5,127,340 | 7/1992 | Maro et al. | 108/107 |

FOREIGN PATENT DOCUMENTS

| | | | |
|---|---|---|---|
| 2001633 | 7/1971 | Fed. Rep. of Germany | 108/111 |
| 3734819 | 4/1988 | Fed. Rep. of Germany | 108/111 |
| 2533123 | 3/1984 | France | 108/111 |
| 666765 | 9/1964 | Italy | 108/107 |

*Primary Examiner*—Jose V. Chen
*Attorney, Agent, or Firm*—Barnes, Kisselle, Raisch, Choate, Whittemore & Hulbert

[57] ABSTRACT

A shelving unit made of vertical end panels, horizontal shelves, cornice boards and toekicks secured together in a rigid and accurate assembly of parts. The shelf at the midpoint in the height of the end panels is connected to the end panels by shelf support locking pins which restrict the end panels from flexing in or out. Locking pin brackets have locking pins to pull the cornice and toekick tight with respect to the end panels, providing a strong and accurate connection between the parts.

2 Claims, 3 Drawing Sheets

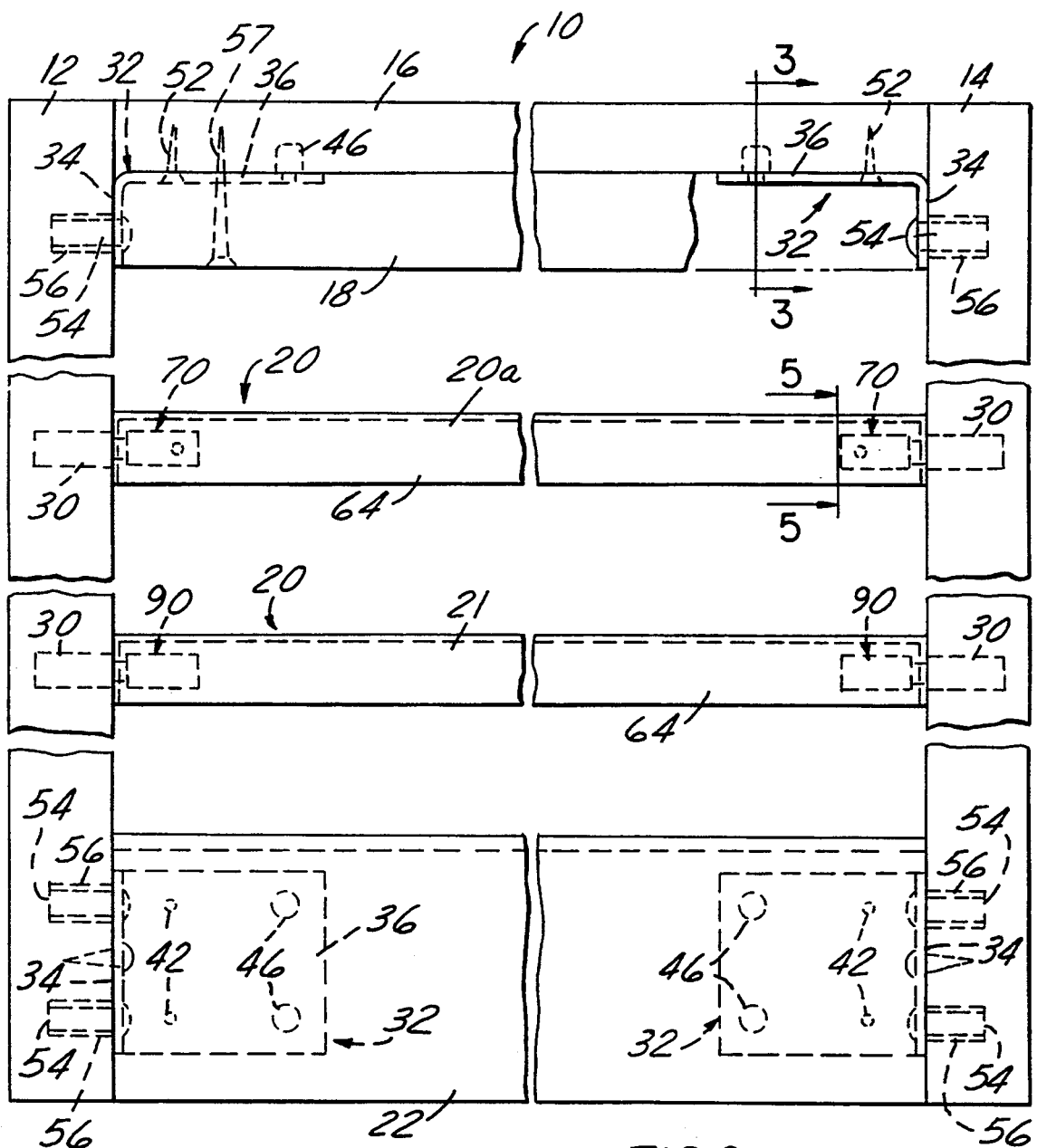
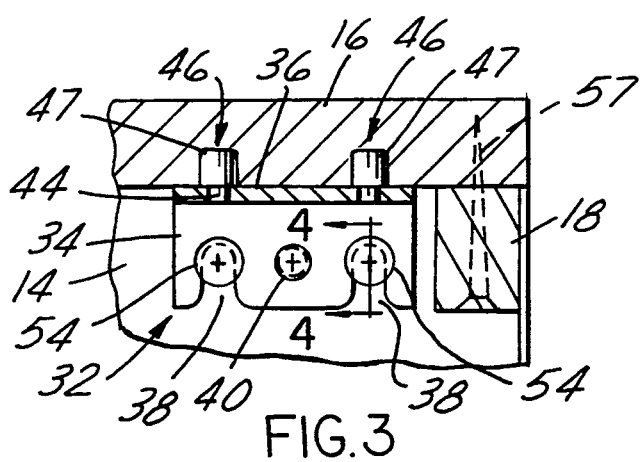
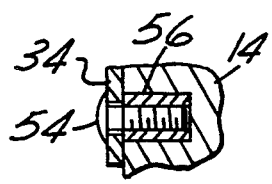

SHELVING UNIT

This invention relates generally to shelving, and refers more particularly to a shelving unit having separable parts connected together by hardware of unique construction.

BACKGROUND AND SUMMARY

Shelving units made of vertical end panels, horizontal shelves, cornice boards, toekicks, etc., are subject to distortion or bowing when overloaded. As an example, the end panels of a shelving unit such as a bookcase may bow outwardly if subjected to loads greater than that for which the unit is designed.

One object of this invention is to provide a shelving unit which is strong and rigid and not susceptible to distortion or bowing even when heavily loaded.

In the shelving unit about to be described, at least one of the shelves is connected to the end panels in a manner which effectively prevents outward bowing. This shelf is preferably located about midway between the top and the bottom of the unit. Other shelves may be connected to the end panels in a conventional manner.

The shelving unit of this invention also has special brackets for securing together the end panels, cornice and toekicks, providing a stronger, more accurate assembly.

Other objects are to provide a shelving unit which is composed of a relatively few simple parts, which is strong and relatively easy to assemble with speed and accuracy, capable of being inexpensively manufactured, and well designed for the accomplishment of its intended function.

These and other objects, features and advantages of the invention will become more apparent as the following description proceeds, especially when considered with the accompanying drawings.

BRIEF DESCRIPTION OF THE DRAWINGS

FIG. 2 is a front elevational view of the shelving unit, with parts broken away.

FIG. 3 is a sectional view taken on the line 3—3 in FIG. 2.

FIG. 4 is a sectional view taken on the line 4—4 in FIG. 3.

DETAILED DESCRIPTION

Figure 1:
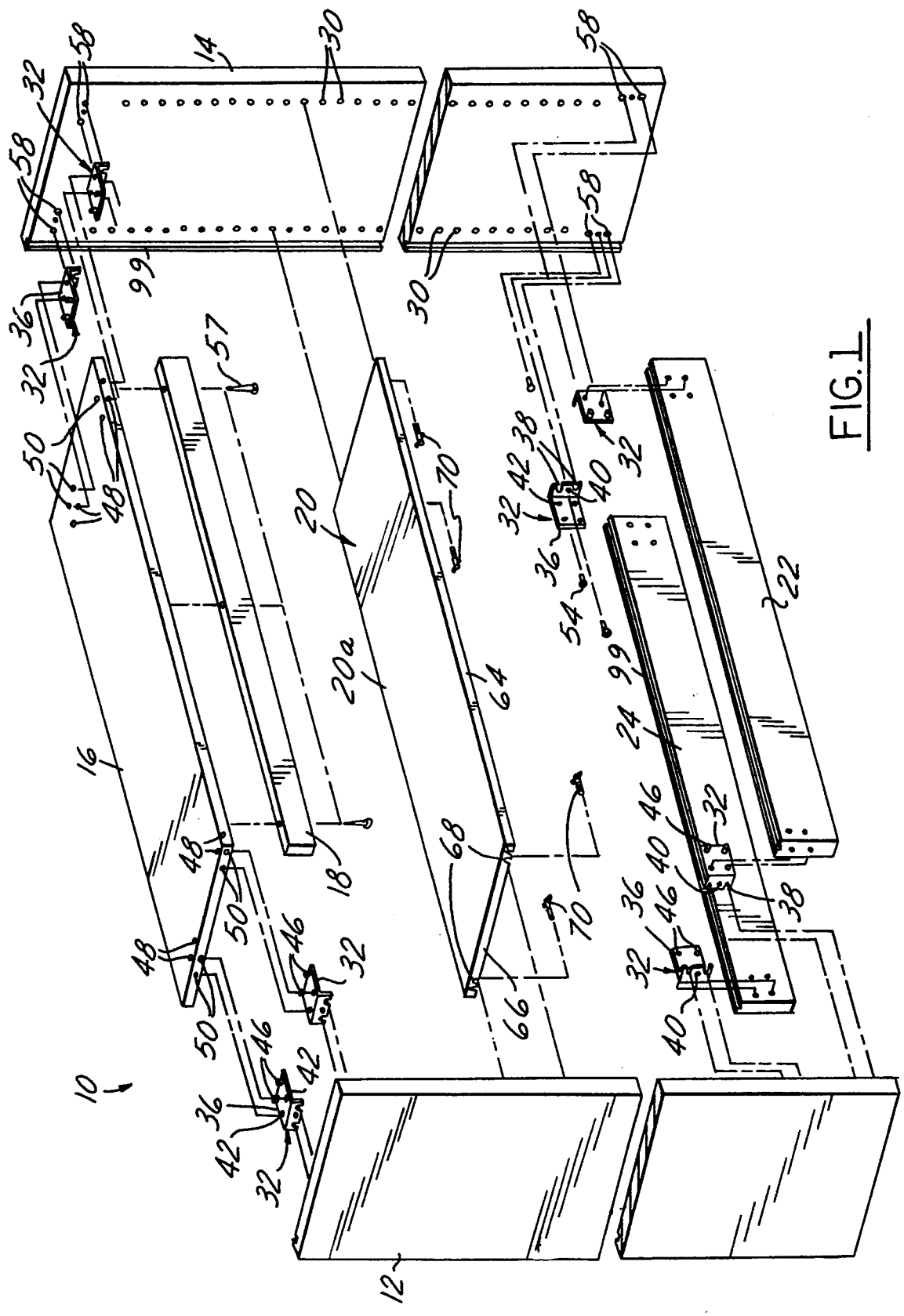
FIG. 1 is an exploded view, with parts broken away, of a shelving unit constructed in accordance with the invention.
Figure 5:
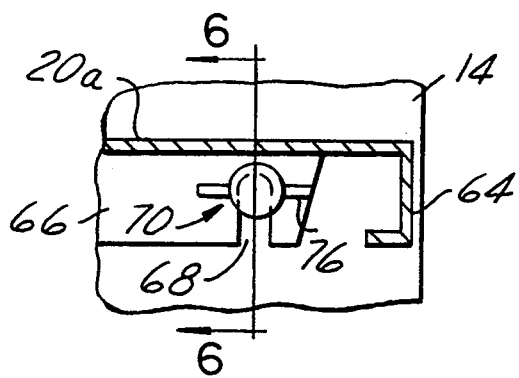
FIG. 5 is a sectional view taken on the line 5—5 in FIG. 2.
Figure 6:
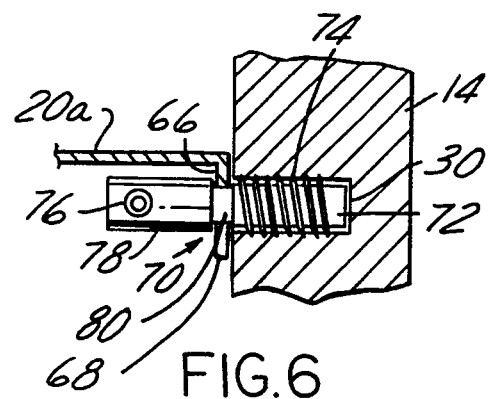
FIG. 6 is a sectional view taken on the line 6—6 in FIG. 5.

Referring more particularly to the drawings, the shelving unit 10 comprises end panels 12 and 14, a cornice 16, cornice front facia 18, shelves 20, and front and back toekicks 22 and 24.

The end panels 12 and 14, the cornice 16, and cornice front facia 18 may be of any suitable construction but in this instance are preferably flat panels of 3-ply particle board construction with thermally fused laminate on both faces. The exposed edges are preferably externally banded with a matching PVC band radiused 3/32". The toekicks 22 and 24 may be of any suitable construction but in this instance are of medium density fiber board.

The end panels 12 and 14 are laterally spaced, elongated, vertical, parallel panels having laterally spaced rows of vertically spaced shelving sockets 30. These rows of sockets are spaced inwardly from the front and rear edges of the end panels and the sockets in each row are horizontally aligned with sockets in the other row to receive shelf mounting elements which will be more fully described hereinafter.

The cornice 16 an elongated flat board extending horizontally between the end panels 12 and 14 at the top of the shelving unit. The ends of the cornice are secured to the end panels by identical front and rear lock pin brackets 32 and suitable fasteners.

Each bracket 32 is an L-shaped plate preferably of metal having a short leg 34 and a long leg 36 at right angles to one another. The short leg 34 terminates in an end edge having laterally spaced notches 38 and a screw hole 40 between the notches. The long leg 36 has two laterally spaced screw holes 42 near the bend in the bracket. The long leg also has two laterally spaced holes near the outer edge of the bracket in each of which the mounting stud 44 of a locking pin 46 is permanently secured as by welding. The locking pins 46 have heads 47 which project away from the surface of the bracket legs 36. The two screw holes 42 and two locking pins 46 are arranged in a rectangular pattern.

In the underside near each corner, the cornice 16 has four holes in the same rectangular pattern as bracket holes 42 and pins 46, two holes 48 for receiving the pins 46 and two holes 50 for screws. The brackets are secured to the cornice by screws 52 extending through the holes 42 in the bracket and into the holes 50 in the cornice so that the long leg 36 is clamped in surface-to-surface relation to the underside of the cornice. The heads of locking pins 46 of the bracket have a close fit in the cornice holes 48. The pins 46 provide a strong, accurate and positive location for the connection between the brackets 32 and the cornice 16 and clamp the cornice tightly to the brackets.

The short leg 34 of each bracket is secured to an end panel by three screws. Two of these screws, numbered 54, are threaded into internally threaded inserts 56 secured in preformed holes 58 in the confronting surfaces of the end panels near the top. The screws 54 extend through the bracket notches 38. The third screw extends through the bracket hole 40 and threads into a hole 60 in the end panel between the threaded inserts 56. The short leg 34 of each bracket is thus clamped tightly against the inner surface of an end panel.

The cornice front facia 18 is secured to the underside of the cornice 16 at the front thereof by screws 57.

The front and rear horizontal toekicks 22 and 24 are secured by lock pin brackets 32 to the end panels in the same manner as the cornice, except that the toekicks are turned into a vertical plane. Thus the longitudinal legs of the brackets are secured to the inner faces of the toekicks by screws and bracket locking pins 46 extending into registering holes in the toekick. The short legs of the brackets are secured to the lower end portions of the end panels by screws threaded through the bracket notches and into inserts 56 seated in holes in the end panels, and center screws extending through the bracket holes and into registering holes in the end panels.

The shelving 20 includes a shelf 20a which is in this instance a flat steel panel or plate having side and end edges turned downwardly to provide side flanges 64 and end flanges 66. The end flanges have notches 68 near the sides of the shelf.

The shelf 20a extends horizontally between the end panels and is mounted thereto by elongated shelf support locking pins 70. Each locking pin 70 has one end portion 72 provided with an external thread or threads 74. A transverse roll pin 76 is secured in a hole in the opposite end portion 78 of the locking pin and serves as a handle for turning the locking pin and threading it into an end panel. The locking pins have a reduced neck portion 80 between the end portions 72 and 78.

Two locking pins 70 are threaded into a pair of horizontally aligned sockets 30 in one end panel and two locking pins 70 are threaded into a pair of horizontally aligned sockets 30 in the other end panel in positions such that all four locking pins are at the same level. The sockets 30 may be pre-threaded, or the locking pins may be self-tapping. The shelf 20a is then placed over the inwardly projecting end positions 78 of the locking pins, with the neck portions 80 received in the notches 68 in the end flanges 66 of the shelf. The shelf is held from pulling away from the locking pins by engagement of the end flanges 66 of the shelf with the shoulders 82 of the locking pins at the juncture of the end portions 78 and neck portions 80.

Figure 7:
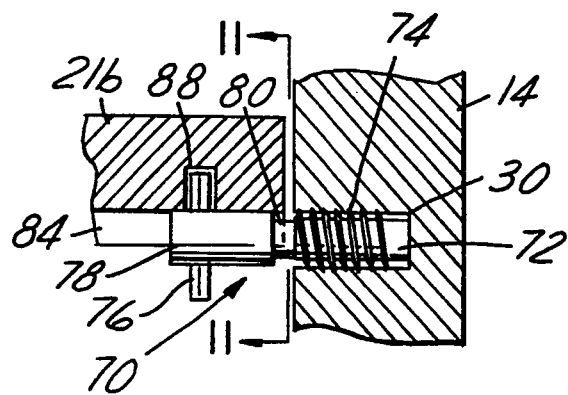
FIG. 7 is a sectional view similar to FIG. 6, but shows the mounting of a shelf of different construction.
Figure 8:
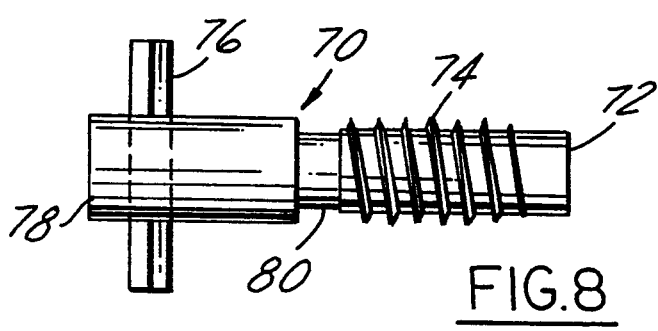
FIG. 8 is an enlarged detail of one of the mounting elements, referred to as a shelf support locking pin, for a shelf.
Figure 9:
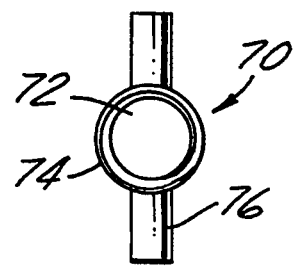
FIG. 9 is an end view of the shelf support locking pin shown in FIG. 8.
Figure 11:
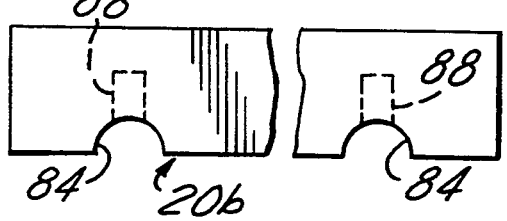
FIG. 11 is a fragmentary view of the shelf of FIG. 7 taken on the line 11—11 in FIG. 7, with the shelf support locking pin removed.
Figure 12:
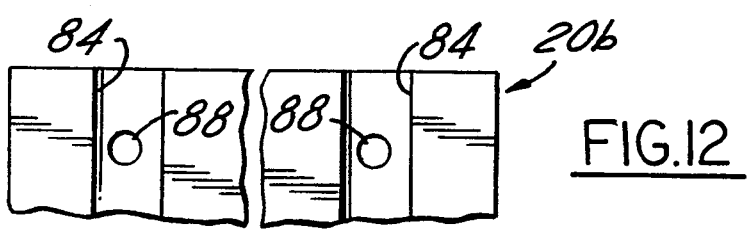
FIG. 12 is a bottom view thereof.

FIG. 7 shows a locking pin 70 with a shelf 20b of a different construction. The shelf 20b is a wood shelf and has a pair of laterally spaced, longitudinally extending semi-cylindrical grooves 84 in the bottom which extend from one end of the shelf to the other to receive the end portions 78 of the locking pins. The bottom of the shelf has a vertical socket 88 extending into each groove 84 near each end to receive one end of the roll pin 76 and prevent the end panel from pulling away and bowing outwardly away from the shelf. The shelf 20a or 20b preferably is placed about midway between the top and bottom of the shelving unit 10 for maximum effect in preventing outward bowing.

Figure 10:
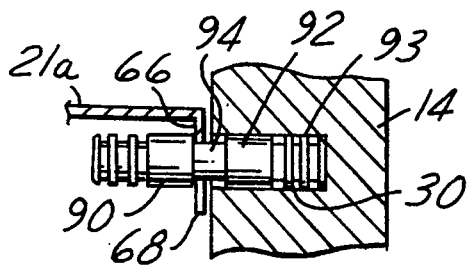
FIG. 10 illustrates a mounting element of a different construction.

Obviously, one or more of the other shelves 20 may be mounted to the end panels 12 and 14 by the shelf support locking pins 70. However, the other shelves, for example, the shelf 21a which is identical to shelf 20a, may be mounted to the end panels 12 and 14 by support pins 90 which are not threaded in the sockets 30. See FIG. 10. Instead of threaded ends, pins 90 have ends 92 provided with collars 93 which have a friction engagement with the sockets 30 and hence do not offer much resistance to pulling out. The support pins 90 each have a reduced neck portion 94 between the ends engaged by the notches 68 in the end flanges 66 of the shelf.

A back panel (not shown) may be added to the back of the unit, mounted in grooves 99 in the end panels, cornice and back toekick. The front toekick has a similar groove, but only because the front and back toekicks are interchangeable.

The lock pin brackets 32 offer positive location, each having two locking pins 46 to pull the cornice and toekicks tight, and also provide greater strength than simple wood blocks.

The shelf support locking pins 70 for a shelf at the midpoint in the height of the end panels restricts the end panels from flexing or bowing in or out.

What is claimed is:

1. A shelving unit comprising laterally spaced, upright end panels, shelving extending between said end panels comprising an elongated shelf having opposite ends, and means for connecting said ends of said shelf to said respective end panels, said connecting means comprising a first pair of spaced apart shelf locking pins each having a threaded end portion threadedly engaged and anchored in one of said end panels and a shelf-supporting end portion projecting from said one end panel in supporting engagement with one end portion of said shelf, a second pair of spaced apart shelf locking pins each having a threaded end portion threadedly engaged and anchored in the other of said end panels and a shelf-supporting end portion projecting from said other end panel toward said one end panel in supporting engagement with the other end portion of said shelf, the opposite end portions of said shelf having grooves in the underside thereof receiving said shelf-supporting end portions of said respective locking pins, said shelf-supporting end portions of said locking pins each having a transverse pin projecting radially from diametrically opposite sides thereof providing a handle to facilitate threading the same into said end panels, and said end portions of said shelf having sockets receiving said respective transverse pins to prevent said locking pins from pulling away from said shelf.

2. A shelving unit comprising laterally spaced upright first and second end panels, an elongated, horizontal panel extending between said end panels and having first and second ends, first means securing said first end of said horizontal panel to said first end panel and second means securing said second end of said horizontal panel to said second end panel, said first securing means comprising a first pair of spaced apart L-shaped brackets, said second securing means comprising a second pair of spaced apart L-shaped brackets, each bracket having first and second legs, first means connecting said first leg of each said bracket to said horizontal panel including spaced apart pins rigidly secured to said first leg and each having a head projecting therefrom, sockets in said horizontal panel receiving said pin heads, fasteners clamping said first leg of each bracket to said horizontal panel, said second leg of each bracket having an edge provided with spaced apart notches, and fasteners slidably received in said notches and clamping said second leg of each bracket of said first and second pair of brackets to said first and second end panels, respectively.

* * * * *